United States Patent
Schödel et al.

(10) Patent No.: US 10,933,621 B2
(45) Date of Patent: Mar. 2, 2021

(54) APPARATUS FOR ADDITIVELY MANUFACTURING OF THREE-DIMENSIONAL OBJECTS

(71) Applicant: CONCEPT LASER GMBH, Lichtenfels (DE)

(72) Inventors: Frank Schödel, Kronach (DE); Peter Pontiller-Schymura, Neudrossenfeld (DE); Boris Eichenberg, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 35 days.

(21) Appl. No.: 16/056,184

(22) Filed: Aug. 6, 2018

(65) Prior Publication Data
US 2019/0047276 A1   Feb. 14, 2019

(30) Foreign Application Priority Data
Aug. 9, 2017 (EP) .................................... 17185639

(51) Int. Cl.
| | |
|---|---|
| *B33Y 30/00* | (2015.01) |
| *B33Y 50/02* | (2015.01) |
| *B29C 64/264* | (2017.01) |
| *B29C 64/393* | (2017.01) |
| *B29C 64/153* | (2017.01) |
| *B22F 3/105* | (2006.01) |
| *B29C 64/268* | (2017.01) |
| *B33Y 10/00* | (2015.01) |

(52) U.S. Cl.
CPC ............ *B33Y 30/00* (2014.12); *B22F 3/1055* (2013.01); *B29C 64/153* (2017.08); *B29C 64/264* (2017.08); *B29C 64/268* (2017.08); *B29C 64/393* (2017.08); *B33Y 50/02* (2014.12); *B22F 2003/1057* (2013.01); *B33Y 10/00* (2014.12)

(58) Field of Classification Search
None
See application file for complete search history.

(56) References Cited

U.S. PATENT DOCUMENTS

| | | | |
|---|---|---|---|
| 4,986,658 A * | 1/1991 | Kim .......................... | G01J 3/02 356/318 |
| 2015/0268099 A1 | 9/2015 | Craig et al. | |
| 2016/0052086 A1 | 2/2016 | Mazumder et al. | |
| 2016/0236279 A1 * | 8/2016 | Ashton ................. | B22F 3/1055 |

FOREIGN PATENT DOCUMENTS

WO   2015040433 A2   3/2015

\* cited by examiner

*Primary Examiner* — Ryan A Jarrett
(74) *Attorney, Agent, or Firm* — Dority & Manning, P.A.

(57) ABSTRACT

Apparatus (1, 14) for additively manufacturing of three-dimensional objects (2) by means of successive layerwise selective irradiation and consolidation of layers of a build material (3) which can be consolidated by means of an energy beam (4), wherein the energy beam (4) is guided onto a build plane (5) via an irradiation device (6), wherein an evaluation unit (11) is provided that is adapted to determine spectral information of radiation (12) emitted in the manufacturing process.

19 Claims, 3 Drawing Sheets

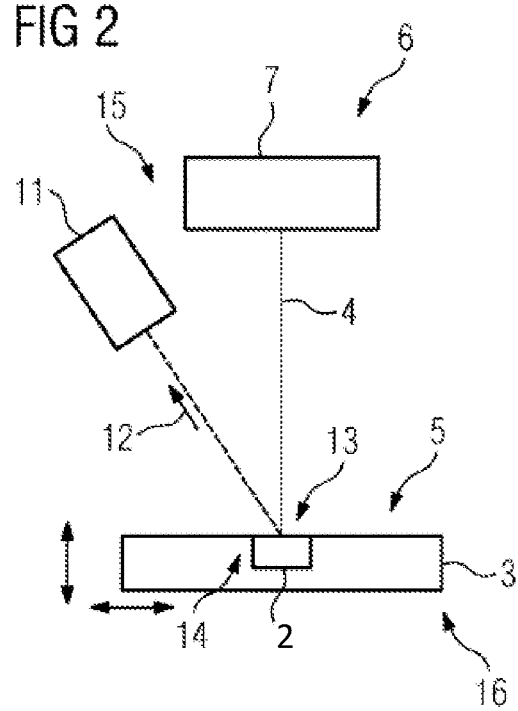
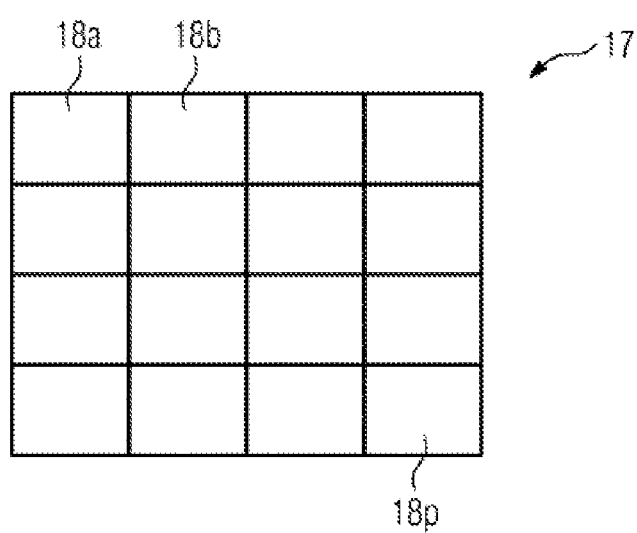

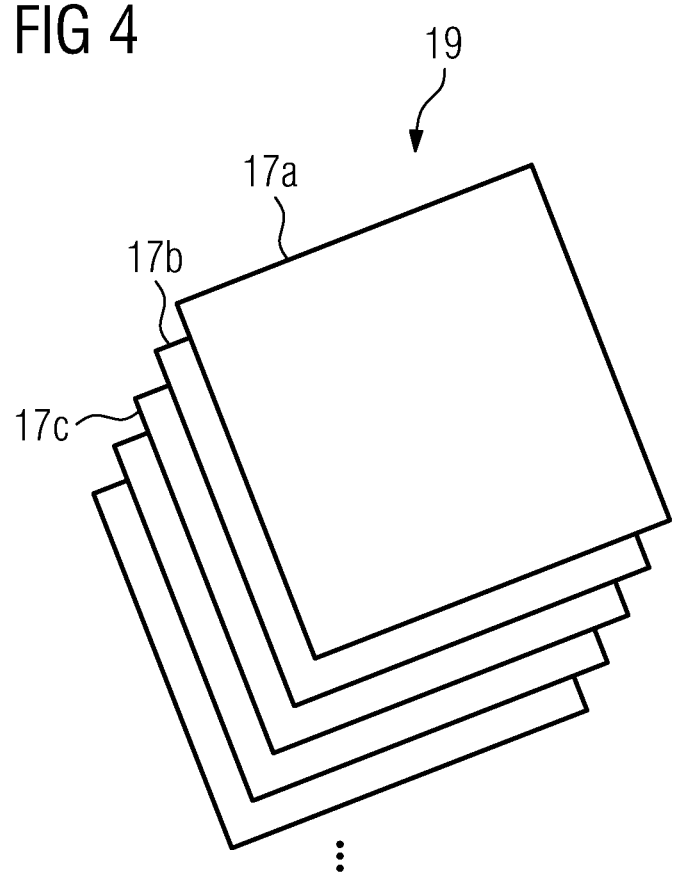

APPARATUS FOR ADDITIVELY MANUFACTURING OF THREE-DIMENSIONAL OBJECTS

CROSS-REFERENCE TO RELATED APPLICATIONS

This application claims priority to European Patent Application Ser. No. 17,185,639.6 filed Aug. 9, 2017, the contents of which is incorporated herein by reference in its entirety as if set forth verbatim.

The invention relates to an apparatus for additively manufacturing of three-dimensional objects by means of successive layerwise selective irradiation and consolidation of layers of a build material which can be consolidated by means of an energy beam, wherein the energy beam is guided onto a build plane via an irradiation device.

In prior art, additive manufacturing apparatuses are known that comprise an irradiation device adapted to generate and guide at least one energy beam. The energy beam is guided over a surface of build material arranged in a build plane, wherein the energy beam travels along an energy beam path. By traveling along the energy beam path at least one consolidation zone is defined in which the build material is directly irradiated by the energy beam and the respective layer of build material is thereby selectively consolidated. By successively irradiating multiple layers the three-dimensional object is built.

Further, it is known from prior art to detect radiation that is emitted from the build plane, for example from a consolidation zone. By detecting the radiation information can be generated, e.g. relating to the process and object quality. For example, it is possible to detect or measure the temperature of the consolidation zone.

It is an object to provide an apparatus that allows for the generation of a larger scope of information.

The object is inventively achieved by an apparatus according to claim 1. Advantageous embodiments of the invention are subject to the dependent claims.

The apparatus described herein is an apparatus for additively manufacturing three-dimensional objects, e.g. technical components, by means of successive layerwise selective irradiation and consolidation of layers of a powdered build material ("build material") which can be consolidated by means of an energy beam. A respective build material can be a metal, ceramic or polymer powder. A respective energy beam can be a laser beam or an electronic beam. A respective apparatus can be a selective laser sintering apparatus, a selective laser melting apparatus or a selective electron beam melting apparatus, for instance.

The apparatus comprises a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

The invention is based on the idea that an evaluation unit is provided that is adapted to determine spectral information of radiation that is emitted in the manufacturing process. Thus, it is possible to use the spectral information, e.g. a spectral composition, of radiation generated in the manufacturing process to obtain information relating to parameters influencing the manufacturing process. For example, such parameters are a composition of the build material, in particular impurities or local variations of the composition, and/or a humidity of the build material. By evaluating the spectrum of radiation that is emitted in the manufacturing process it is possible to verify that process and/or object quality requirements are met. Thus, spectral information of radiation emitted in the manufacturing process is determined and may be further processed, for example to evaluate specific characteristics of the build material and/or the object to be manufactured. In particular, the composition of the material the radiation is emitted from can be evaluated as will be described in detail later.

In the scope of this application, radiation that is emitted in the manufacturing process is understood as any radiation that is sent out from a location inside a process chamber, e.g. a build plane, of an apparatus for additively manufacturing three-dimensional objects. The term "emission" or "emitted" includes all possible ways radiation can be sent out from a volume, a position or a plane, such as but not limited to a reflection at a surface or a thermal emission of radiation from a surface or from a volume of build material. Thus, spectral information can be obtained from the energy beam that is used to irradiate the build material and is reflected in the consolidation zone (the reflected part of the energy beam) as well as thermal radiation that is generated by depleting energy in a volume of build material thereby heating the build material, for instance.

In particular, the composition of the spectrum of the emitted radiation can be evaluated to derive information relating to the composition and/or the quality of the consolidation of build material in the manufacturing process. In the scope of this application the term "spectrum" refers to the entirety of different wavelengths the radiation is composed of. The spectrum of the emitted radiation varies dependent on different process parameters influencing the manufacturing process. Therefore, by determining spectral information of the emitted radiation it is possible to evaluate the spectral information, e.g. extrapolate from the determined spectral information to at least one process parameter present in the manufacturing process.

According to an advantageous embodiment of the apparatus, the evaluation unit is adapted to determine spectral information of radiation emitted from the build plane and/or emitted from a volume or a surface between a focusing optic of the irradiation device and the build plane. Thus, it is possible to determine spectral information of radiation that is emitted from the build plane, i.e. a surface of build material arranged inside a process chamber, wherein at least one energy beam can be guided onto the build plane in that build material arranged in the build plane can be irradiated to consolidate the build material. By determining the spectral information emitted from the build plane it is possible to directly derive information relating to the regions that have been directly irradiated with the energy beam and thereby consolidated and also to derive information relating to adjacent volumes of build material, e.g. indirectly heated due to thermal flux.

Additionally, it is possible to determine spectral information of radiation that is emitted from a volume, in particular a gas volume, between a focusing optic of the irradiation device and the build plane. The focusing optic is used to focus the energy beam onto the build plane. Typically, the process chamber is filled with an inert gas, such as argon, to assure an inert process environment displacing undesired gas, such as oxygen, to avoid the reactive build material to react with such undesired gases. Further, by irradiating the build material residues may be produced that are loaded in the gas inside the process chamber. Besides, by irradiating the build material it is possible that at least a part of the build material partially evaporates producing a vapor of build material and/or smoke (e.g. due to residues in the process gas) that is located, in particular directly, above the build plane. Thus, it is possible that radiation, e.g. the energy beam, is emitted by the process gas, in particular scattered or reflected at contents of the process gas contained in the process chamber, i.e. residues the process gas is charged with and/or the build material vapor.

The radiation emitted from this volume of gas can be analyzed by the evaluation unit to determine the spectral information thereof. By way of this embodiment it is possible that build material in the vapor phase can be analyzed, in particular the composition of the build material that has been evaporated. Further, the residues or other particles the process gas is charged with can be determined as well. In particular, the (chemical) composition of the process gas can also be analyzed by deriving information relating to the spectral composition thereof.

According to another embodiment of the apparatus, the evaluation unit is adapted to determine spectral information relating to a spectral composition of the radiation emitted in the manufacturing process, in particular information relating to at least one emission line and/or at least one absorption line of the spectrum of the radiation emitted in the manufacturing process. This embodiment allows for the determination of the spectral composition of the radiation emitted during the manufacturing process. For example, the evaluation unit is adapted to generate information relating to emission lines or absorption lines in the spectrum of the emitted radiation. In particular, the spectrum of thermal radiation emitted from the build plane can be analyzed, regarding characteristic emission lines contained therein.

Besides, thermal radiation can be analyzed that is emitted from the build plane and passes through a defined volume, e.g. a gas volume and/or vapor volume above the build plane. By passing through the defined volume, radiation with characteristic wavelengths is absorbed by the defined volume, e.g. by the gas itself and/or material, such as residues, the volume is charged with. The absorption of radiation with characteristic wavelengths leads to characteristic absorption lines in the corresponding spectrum.

Further, material in the defined volume, e.g. gas molecules, chemical compounds, nonconsolidated build material etc. can be stimulated by the radiation passing through the volume, i.e. thermal radiation as well as the energy beam. Hence, the resulting spectrum can contain characteristic lines, particularly emission lines, indicating the presence of corresponding material in the defined volume.

Thus, the respective spectral lines can be used to identify chemical compounds, elements or atoms due to their characteristic emission lines and/or absorption lines, respectively. Therefore, it is possible to generate information relating to the composition of build material (or the gas volume the radiation is emitted from) in that local variations, e.g. due to impurities or deviations in the (chemical) composition of the build material, can be obtained.

The apparatus can further be improved in that the evaluation unit is adapted to determine the spectral information of radiation emitted from at least one consolidation zone of the build plane, in which consolidation zone the energy beam directly irradiates the build material and/or to determine spectral information of radiation emitted from at least one adjacent zone of the build plane adjacent to the at least one consolidation zone. In the consolidation zone the energy beam directly irradiates the build material in the build plane, wherein the build material in the consolidation zone at least partially melts. Due to consolidating, e.g. melting the build material, for example metallic powder, a locally high excited plasma is generated. The radiation emitted from the plasma contains information relating to the molten material, e.g. the composition thereof, as well as the process parameters present in the consolidation zone, e.g. the local temperature. According to this embodiment, it is also possible to determine spectral information of radiation that is emitted from an adjacent zone, wherein an adjacent zone in the scope of this application refers to a zone adjacent to at least one consolidation zone, wherein the adjacent zone is in thermal contact with the consolidation zone in that the deposition of energy in the consolidation zone leads to a heating of the adjacent zone due to the thermal flux between the consolidation zone and the adjacent zone. The adjacent zone is located adjacent to the consolidation zone, e.g. surrounds the consolidation zone.

According to another embodiment of the apparatus, the evaluation unit is adapted to determine the spectral information locally and/or timely resolved, in particular for at least one consolidation zone and/or at least one adjacent zone. Thus, the local variation of the determined spectral information and/or the variation of the spectral information over time can be determined. Therefore, it is possible to record the variation of build material, e.g. a chemical or physical variation of the build material, over time and with respect to different positions on the build plane. Further, the spectral information can be recorded for different layers of the three-dimensional object, in that a variation of the determined spectral information between several layers can be observed. Thus, the spectral information can be recorded for different points in time and for a different positions on the build plane in that different positions or regions of the object that is manufactured can be linked to process parameters present during the manufacturing process that can be derived by analyzing the spectral information of radiation emitted from the respective position or region. For example, various process steps can be characterized by way of this embodiment, such as cooling processes, wherein the spectral information can be regarded over time to characterize the cooling characteristics of the build material that has been consolidated. Thus, the formation of possible thermal strains or mechanical stress can be analyzed as the cooling behavior of the consolidation zone and/or the adjacent zones can be monitored.

The respective embodiment of the apparatus can further be improved in that the evaluation unit is adapted to generate a map of at least one part of the build plane, comprising determined spectral information for at least two positions on the build plane and/or for at least two points in time. By way of this embodiment it is possible to determine spectral information of radiation that has been emitted from defined positions in the process chamber, in particular from the build plane, and/or at defined points in time and to generate a map, in which the determined information is stored. Thus, the map contains spectral information derived for defined coordinates in the process chamber, in particular in the build plane. Thus, it is possible to correlate regions of the build plane with process parameters as the determined spectral information for the respective regions are stored in the map. The map therefore, contains the spectral information determined for at least two positions inside the process chamber, in particular on the build plane, allowing to derive information relating to the process parameters present during the manufacturing of the respective regions or position, respectively. Additionally, the map can contain spectral information determined for two or more different points in time, wherein for at least one region or position on the map the variation over time of the spectral information that have been determined is stored. Thus, the map can be understood as a topographic map of the respective region of the build plane, wherein spectral information can be stored. The map can also be understood or stored as a matrix with several entries corresponding to spectral information of respective regions (or volumes) in which radiation is emitted during the manufacturing process. Additionally, it is possible to generate visualization data to display the spectral information to a user, e.g. map-based, in particular like a topographic map. The map may further be adapted to display the change of spectral information for at least one region of a layer over time, e.g. like a dynamic map.

The embodiment described above allows for enhanced quality management since the regions of the built object can be correlated to the process parameters that were present during the manufacturing process of the same.

Further, the evaluation unit advantageously is adapted to generate a 3D-map comprising spectral information, in particular at least two maps, of at least two different layers of the object additively built in the manufacturing process. Thus, according to the embodiment described above a map is generated for at least two different layers, wherein the evaluation unit may generate a 3D-map comprising at least two maps relating to the different layers. The 3D-map therefore, provides information for various, in particular all, regions of the single layers the three-dimensional object is successively built of. Hence, it is possible to look up the spectral information detected during the manufacturing of the single regions of the layers of the three-dimensional object, for example to verify specific process and/or object quality parameters are met. Thus, the 3D-map is a collection of at least two maps as described before. Of course, it is also possible to generate visualization data allowing for the 3D-map to be displayed to a user.

According to another advantageous embodiment of the apparatus, a data storage unit is provided that is adapted to store the spectral information and/or at least one map and/or at least one 3D-map. Thus, a protocol for the three-dimensional object that is built during the manufacturing process can be stored, i.e. the protocol can be analyzed subsequent to the manufacturing process. The storage of a map for part of a layer or a 3D-map relating to the object or a single spectral information present throughout the manufacturing process can be linked to the resulting object that has been built during the manufacturing process. For example, process parameters can be read out timely and locally resolved, for example the energy depleted in the build material or the local composition of build material that has been consolidated to form the three-dimensional object. The storage unit may further contain information related to data that has been previously determined, such as experimental data and/or calibration data relating to characteristics of certain materials, e.g. a chemical composition of a defined material. Thus, the respective spectral information of defined materials may be (experimentally) determined in advance to the manufacturing process, wherein the previously determined data can be compared to the spectral information determined in the manufacturing process.

Advantageously, the evaluation unit is adapted to detect the spectral information during the manufacturing process. This allows for an "online-" monitoring of process parameters in that the deviations from defined process parameters or requirements can be corrected while the manufacturing process is performed to avoid or reduce negative impacts on the three-dimensional object being built.

The apparatus can further advantageously be improved in that the evaluation unit is confocally arranged with the energy beam or separately arranged. Dependent on the setup of the apparatus, in particular whether the apparatus, i.e. the irradiation device, comprises a beam scanning unit, the evaluation unit is confocally arranged or separately arranged. In setups comprising a beam scanning unit, such as a laser scanner, a confocal arrangement of the evaluation unit with the energy beam is preferred, wherein in setups without beam scanning units, e.g. setups in which the build plane is moved relative to the energy beam, a separate arrangement can be preferred. Particularly, the separate arrangement of the evaluation unit allows for a determination of the spectral information independent of restrains coming from optical components of the irradiation device. Further, the region the spectral information shall be determined in may be selected independent of the current energy beam position, i.e. the energy beam path or independent from the consolidation zone, respectively.

Another advantageous embodiment of the apparatus suggests that a control unit is adapted to calibrate the evaluation unit. Especially, when using a confocal setup, as described before, the spectral information determined by the evaluation unit is superposed with spectral properties of the optical components used in the setup. The control unit therefore, is adapted to take those influences into calculation and/or calibrate those impacts on the determined spectral information, e.g. by a calculative compensation or a calibration measurement the influences on the determined spectral information can be compensated or eliminated.

In particular, the spectral information comprises and/or relates to:
at least one property of the build material, in particular a (chemical) composition and/or a humidity of the build material and/or impurities in the build material and/or
a temperature and/or a locally and/or a timely temperature variation of at least one consolidation zone and/or at least one adjacent zone and/or
a temperature gradient between at least two adjacent zones and/or at least one adjacent zone and at least one consolidation zone.

Thus, the build material can be characterized, in particular a (chemical) composition of a build material can be verified, e.g. mixtures of different build materials or impurities in the build material can be identified. Different material or the degree of different material contained in the build material can be determined by evaluating characteristic emission lines and/or absorption lines that are characteristic for specific elements.

Further, the evaluation unit can be used to determine spectral information that relates to a temperature and/or temperature variation in a consolidation zone or an adjacent zone. Thus, a temperature gradient can be derived to characterize the object to be built, in particular regarding possible thermal strains or mechanical stress in the object.

Besides, the invention relates to an evaluation unit, in particular for an apparatus as described above, wherein the evaluation unit is adapted to determine spectral information of radiation emitted from a build plane. Of course, all features, advantages and details described with respect to the apparatus are fully transferable to the evaluation unit.

Additionally, the invention relates to a method for operating at least one apparatus, in particular an apparatus as described above, for additively manufacturing three-dimensional objects by means of successive layerwise selective irradiation and consolidation of layers of a build material which can be consolidated by means of an energy beam, wherein the energy beam is guided onto a build plane, wherein a spectral information of radiation emitted in the manufacturing process is determined. Of course, all features, advantages and details described with respect to the apparatus are fully transferable to the method.

Exemplary embodiments of the invention are described with reference to the FIG. The FIG. are schematic diagrams, wherein FIG. 1 shows an inventive apparatus according to a first embodiment;

FIG. 2 shows an inventive apparatus according to a second embodiment;

FIG. 3 shows a map determined by an evaluation unit of the inventive apparatus; and FIG. 4 shows a 3D-map containing the map of FIG. 3.

Figure 1:
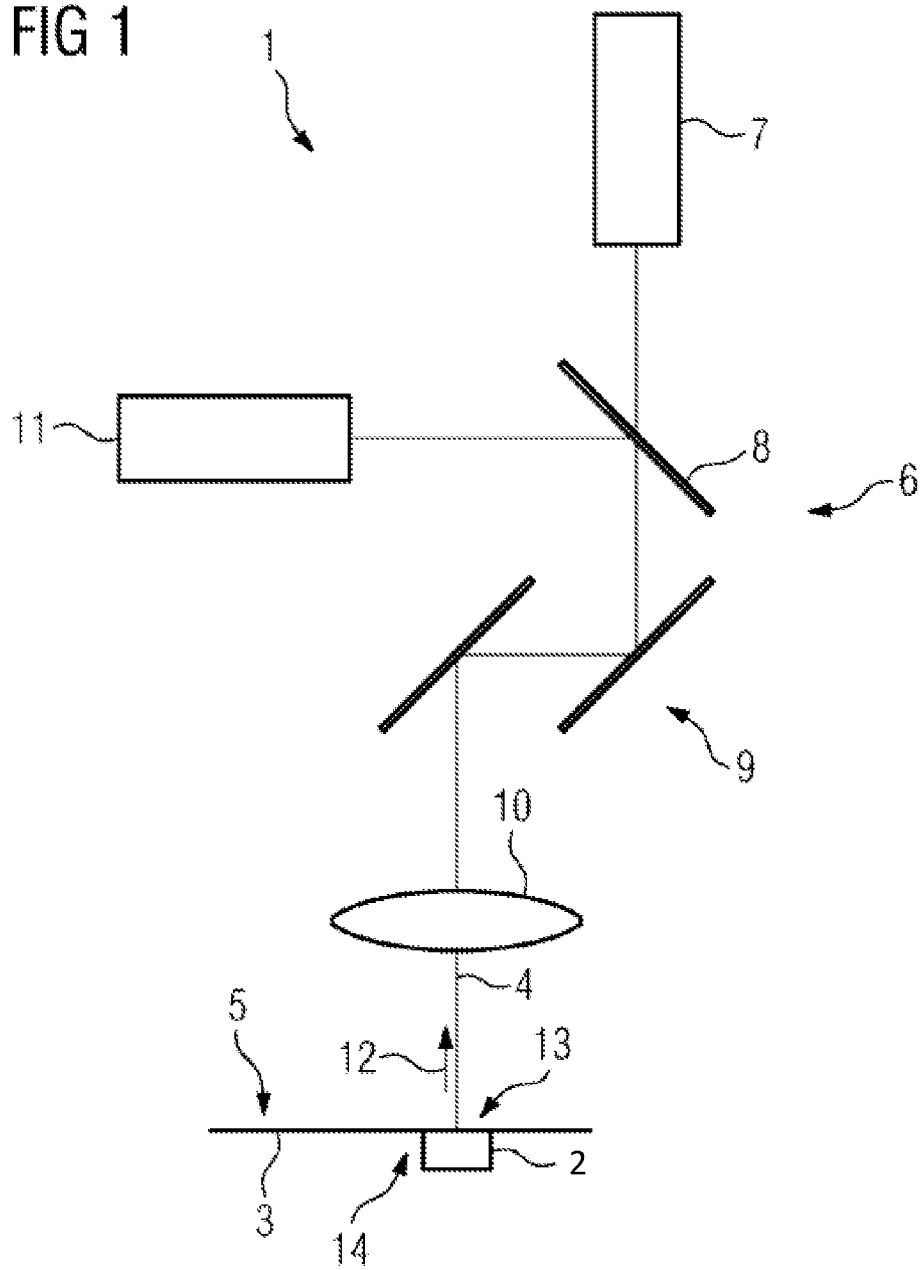

FIG. 1 shows an apparatus 1 for additively manufacturing of three-dimensional objects 2 by means of successive layerwise selective irradiation and consolidation of layers of a build material 3 which can be consolidated by means of an energy beam 4. The energy beam 4 is guided onto a build plane 5 via an irradiation device 6. According to this embodiment the irradiation device 6 comprises a beam generating unit 7, a beam splitter 8, a beam scanning unit 9 and optical components 10 (schematically shown by a single lens, e.g. assigned to a focusing optic).

The apparatus 1 further comprises an evaluation unit 11 that is adapted to evaluate spectral information of radiation 12 emitted in the manufacturing process, in particular emitted from the build plane 5 (depicted by an arrow). Thus, the evaluation unit 11 is adapted to determine spectral information of radiation 12 that is reflected at or sent out from the build material 3 arranged in the build plane 5. In particular, the energy beam 4 may, in a specific part, be reflected at a consolidation zone 13, in which the energy beam 4 directly irradiates and thereby consolidates the build material 3. The radiation 12 may also be emitted from an adjacent zone 14 that is adjacent to at least one consolidation zone. The adjacent zone 14, for example, emits thermal radiation due to heating.

The radiation 12 may also be emitted from a volume, in particular a volume of gas (not shown), e.g. between the optical components 10 and the build plane 5. The volume of gas may contain, inter alia, evaporated build material 3 and/or inert gas, for example argon and/or residues generated in the irradiation process. Upon detection of the spectral information relating to radiation 12 that is emitted from the volume, the composition of the volume can be analyzed. This allows for the analysis of the volume in that it can be determined which elements or chemical compounds the volume contains.

Further, thermal radiation 12 emitted from the build plane may pass through the volume of gas, wherein parts of the radiation 12 with characteristic wavelengths are absorbed by the volume of gas, in particular gas elements or gas molecules and/or material the volume of gas is charged with, e.g. nonconsolidated build material and/or residues. Thus, the resulting spectrum of the radiation 12 containing the corresponding absorption lines can be evaluated.

The spectral information determined by the evaluation unit 11 in particular relates to a composition of the build material 3 in that impurities in the build material 3 or the composition of the build material 3 can be identified, for example metallic, ceramic and synthetic components in the build material 3. Therefore, characteristic lines in the spectrum of the detected radiation 12 can be allocated to respective elements allowing for an identification of the composition of the build material 3.

Hence, the intensities of recorded emission lines and/or absorption lines, i.e. the intensity distribution of the resulting spectrum can be evaluated. The corresponding intensities indicate an amount of material or proportions of different materials contained in the evaluated volume, especially with constant temperature.

The apparatus 1 further comprises a control unit (not shown) that is adapted to control various components of the apparatus 1, such as the irradiation device 6, in particular the beam generating unit 7 and the beam scanning unit 9. The control unit further is adapted to calibrate the evaluation unit 11 in that influences on the determined spectral information, e.g. due to spectral characteristics of the optics components 10, are taken into account and can be compensated.

FIG. 2 shows an apparatus 15 according to a second embodiment of the invention. The setup of the apparatus 15 is similar to the setup of the apparatus 1 shown in FIG. 1. Therefore, the same numerals are used for the same components. The apparatus 15 also comprises an irradiation device 6, wherein the irradiation device 6 of the apparatus 15 merely comprises a beam generating unit 7 generating the energy beam 4 that is guided onto the build plane 5. Deviant from the apparatus 1, the apparatus 15 comprises a build plate 16 carrying the build material 3 and the object 2 to be built, wherein the build plate 16 is movable in a vertical and horizontal direction (shown by vertical and horizontal arrows).

The apparatus 15 like the apparatus 1 comprises an evaluation unit 11 that is adapted to detect spectral information of radiation 12 emitted from the build plane 5. The evaluation unit 11 is arranged separately regarding the optical beam path of the energy beam 4, whereas the evaluation unit 11 of the apparatus 1 is arranged confocally with the energy beam 4.

The evaluation units 11 of the apparatuses 1, 15 are adapted to resolve the determined spectral information locally and timely. With respect to FIG. 3 a map 17 is shown that can be generated by the evaluation units 11. The map 17 therefore, contains spectral information detected in various positions 18a to 18p of the build plane 5 (exemplary 16 different positions). Thus, the build plane 5 may be divided into the separate positions 18a to 18p, wherein in the map 17 the spectral information determined in the various positions 18a to 18p is stored. Of course, it is also possible to store different detected spectral information for different points in time instead of or additionally to the different lateral positions 18a to 18p referring to lateral positions on the build plane 5.

Upon irradiation of the build material arranged in the current layer, i.e. the layer of build material that has been applied last, it is possible that the incident radiation, i.e. the energy beam 4 has effect on at least one layer, e.g. five layers, that have been consolidated before. In other words, the energy beam 4 may pass through the current layer (uppermost layer) and penetrate a defined number of previously irradiated layers arranged beneath the current layer, wherein the generated radiation 12, particularly thermal radiation 12, contains information of all layers the energy beam 4 has affected. Thus, the corresponding layers contribute to the resulting spectrum of radiation 12, i.e. the corresponding spectral information. The resulting spectral information can therefore, be understood as a rolling parameter regarding the current set of layers that are at least partly affected by the energy beam 4, e.g. partly melted, and contribute to the resulting spectrum.

FIG. 4 shows a 3D-map 19 generated by the evaluation unit 11, wherein the 3D-map comprises multiple maps 17 (17a, 17b, 17c, . . . ), Wherein each map 17 corresponds to a layer irradiated by the energy beam 4. As described before, based on the manufacturing process, it is possible that radiation 12 emitted from a defined number of layers contribute to the resulting spectrum. Thus, the 3D-map 19 depicted in FIG. 4 stores the spectral information corresponding to the manufacturing process of the three-dimensional object 2. The different positions 18a to 18p of each layer are stored so that each position 18a to 18p can be linked to the process parameters present during the manufacturing process.

Of course, the inventive method may be performed on an apparatus as described with respect to the FIG.

The invention claimed is:

1. An apparatus for additively manufacturing of three-dimensional objects by means of successive layerwise selective irradiation and consolidation of layers of a build material which can be consolidated by an energy beam, the apparatus comprising:
an irradiation device adapted to guide the energy beam onto a build plane; and,
an evaluation unit adapted to determine spectral information of radiation emitted when the energy beam consolidates build material in at least one consolidation zone, wherein the evaluation unit determines spectral information from at least one adjacent zone of the building plane adjacent to the at least one consolidation zone;
wherein the spectral information comprises a temperature gradient between at least two adjacent zones.

2. The apparatus of claim 1, the evaluation unit is adapted to determine spectral information of radiation emitted from the build plane.

3. The apparatus of claim 1, the evaluation unit is adapted to determine spectral information of radiation emitted from a volume between a focusing optic of the irradiation device and the build plane.

4. The apparatus of claim 1, the evaluation unit is adapted to determine spectral information relating to at least one emission line of the spectrum of radiation emitted when the energy beam consolidates build material.

5. The apparatus of claim 1, the evaluation unit is adapted to determine spectral information relating to at least one absorption line of the spectrum of radiation emitted when the energy beam consolidates build material.

6. The apparatus of claim 1, wherein the evaluation unit further determines spectral information from the consolidation zone.

7. The apparatus of claim 1, wherein the evaluation unit is adapted to determine the spectral information locally and/or timely resolved.

8. The apparatus of claim 7, wherein the evaluation unit is further adapted to generate at least one map of at least one part of the build plane, comprising determined spectral information for at least two positions on the build plane and/or for at least two points in time.

9. The apparatus of claim 8, wherein the evaluation unit is adapted to generate a 3D-map comprising spectral information of at least two different layers of the object additively built in the manufacturing process.

10. The apparatus of claim 1 further comprising a storage unit adapted to store the spectral information.

11. The apparatus of claim 1 further comprising a control unit adapted to control at least one process parameter dependent on at least one detected spectral information.

12. The apparatus of claim 11, wherein the control unit is further adapted to calibrate the evaluation unit.

13. The apparatus of claim 1, wherein the evaluation unit is confocally arranged with the energy beam.

14. The apparatus of claim 1, wherein the evaluation unit is separately arranged with the energy beam.

15. The apparatus of claim 1, wherein the spectral information comprises at least one property of the build material.

16. The apparatus of claim 15, wherein the property of the build material comprises a composition of the build material.

17. The apparatus of claim 1, wherein the spectral information comprises a temperature of the at least one adjacent zone.

18. The apparatus of claim 1, wherein the spectral information comprises a temperature variation of the adjacent zone.

19. An apparatus for additively manufacturing of three-dimensional objects by means of successive layerwise selective irradiation and consolidation of layers of a build material which can be consolidated by an energy beam, the apparatus comprising:
an irradiation device adapted to guide the energy beam onto a build plane; and,
an evaluation unit adapted to determine spectral information of radiation emitted when the energy beam consolidates build material in at least one consolidation zone, wherein the evaluation unit determines spectral information from at least one adjacent zone of the building plane adjacent to the at least one consolidation zone;
wherein the spectral information comprises a temperature gradient between at least one adjacent zone and at least one consolidation zone.

* * * * *